United States Patent
Subramanian et al.

(10) Patent No.: US 8,780,964 B2
(45) Date of Patent: Jul. 15, 2014

(54) METHODS AND APPARATUS FOR REDUCING AND/OR ELIMINATING THE EFFECTS OF SELF-INTERFERENCE

(71) Applicant: QUALCOMM Incorporated, San Diego, CA (US)

(72) Inventors: Sundar Subramanian, Bridgewater, NJ (US); Xinzhou Wu, Hillsborough, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/656,459

(22) Filed: Oct. 19, 2012

(65) Prior Publication Data
US 2013/0188760 A1    Jul. 25, 2013

Related U.S. Application Data

(60) Provisional application No. 61/589,911, filed on Jan. 24, 2012, provisional application No. 61/589,976, filed on Jan. 24, 2012.

(51) Int. Cl.
*H04B 1/38* (2006.01)
*H04L 5/16* (2006.01)

(52) U.S. Cl.
USPC ........................................ 375/219; 370/276

(58) Field of Classification Search
USPC ....................................................... 375/219
See application file for complete search history.

(56) References Cited

U.S. PATENT DOCUMENTS

| | | | |
|---|---|---|---|
| 6,088,383 A * | 7/2000 | Suzuki et al. | 375/148 |
| 6,771,931 B2 | 8/2004 | Waltho | |
| 6,859,647 B2 | 2/2005 | Ishiguro et al. | |
| 8,085,889 B1 * | 12/2011 | Narayan et al. | 375/346 |
| 2002/0105928 A1 * | 8/2002 | Kapoor et al. | 370/334 |
| 2005/0002369 A1 * | 1/2005 | Ro et al. | 370/342 |
| 2008/0089451 A1 * | 4/2008 | Taylor et al. | 375/346 |
| 2008/0232327 A1 * | 9/2008 | Kuroyanagi et al. | 370/335 |
| 2008/0298524 A1 * | 12/2008 | Koorapaty et al. | 375/348 |
| 2009/0010149 A1 * | 1/2009 | Lee et al. | 370/208 |
| 2009/0231989 A1 | 9/2009 | Larsson et al. | |
| 2010/0027608 A1 * | 2/2010 | Priotti | 375/232 |
| 2011/0103431 A1 | 5/2011 | Narasimha et al. | |
| 2011/0143655 A1 | 6/2011 | Ahn et al. | |
| 2011/0182330 A1 * | 7/2011 | Olson et al. | 375/148 |

FOREIGN PATENT DOCUMENTS

WO    2011051746 A1    5/2011

OTHER PUBLICATIONS

International Search Report and Written Opinion—PCT/US2013/022990—ISA/EPO—May 7, 2013 (121148WO).

\* cited by examiner

*Primary Examiner* — Erin File
(74) *Attorney, Agent, or Firm* — Joseph B. Agusta

(57) ABSTRACT

Methods and apparatus for reducing and/or eliminating the effect of self-interference are described. Various described methods and apparatus are well suited for use in DSRC WAVE systems in which a wireless communications device may acquire and use two DSRC channels, e.g., use one channel for reception while using another channel for transmission at the same time. A wireless communications device which is receiving a signal of interest on a first channel supports concurrent transmission on second channel, e.g., an adjacent channel. Controlled transmission timing synchronization with respect to the received signal of interest facilitates interference estimation and removal. Interference due to spillover energy from the transmission on the adjacent channel is estimated and removed from a received signal to facilitate recovery of the signal of interest.

21 Claims, 8 Drawing Sheets

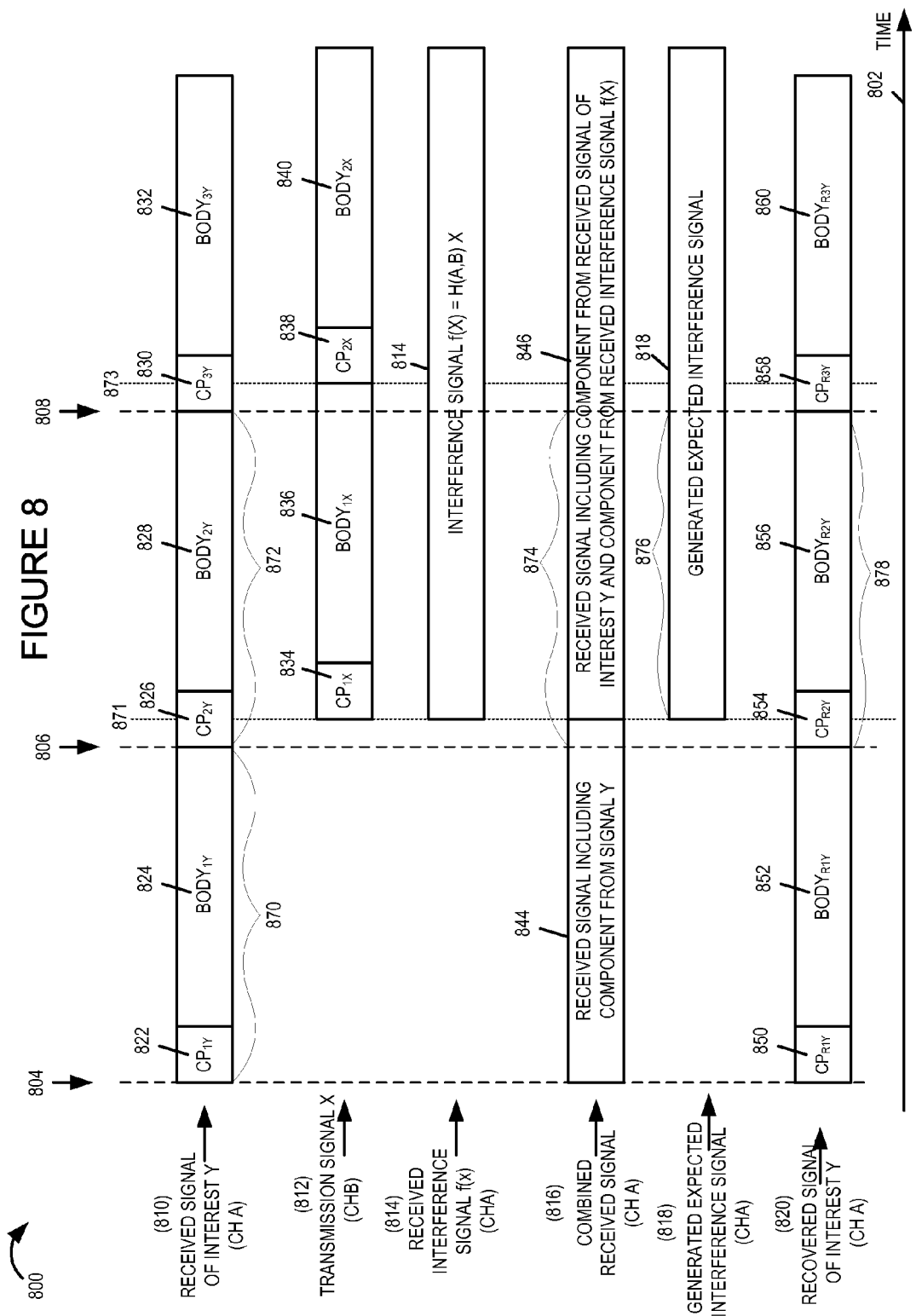

METHODS AND APPARATUS FOR REDUCING AND/OR ELIMINATING THE EFFECTS OF SELF-INTERFERENCE

RELATED APPLICATIONS

The present application claims the benefit of the filing date of Provisional Patent Application Ser. No. 61/589,911, filed Jan. 24, 2012, titled "METHODS AND APPARATUS FOR PROVIDING SYMBOL LEVEL SYNCHRONIZATION IN ASYNCHRONOUS SYSTEMS" and claims the benefit of the filing date of Provisional Patent Application Ser. No. 61/589,976, filed Jan. 24, 12012, titled "METHODS AND APPARATUS TO REMOVE SELF-INTERFERENCE" both of which are assigned to the assignee of the present application and both of which are hereby expressly incorporated by reference in their entirety.

FIELD

The present application relates to interference reduction and, more particularly, to methods and apparatus for reducing and/or eliminating the effect of self-interference, e.g., self-interference in a device which can transmit and receive at the same time.

BACKGROUND

In many systems, such as, e.g., 802.11 based Dedicated Short Range Communications (DSRC) Wireless Access Vehicular Environment (WAVE) systems, a device may be required to operate simultaneously in two or more bands. In DSRC, 7 channels of 10 MHz each have been defined for vehicular use. One of these channels is deemed to be a "safety-only" channel. In DSRC, it is proposed that a vehicle may operate two radios simultaneously; one radio is reserved purely for sending and receiving safety related messages in a safety channel (Channel 172) while another radio is used for non-safety related applications in one of the other 6 channels.

Since the two radios within a device are very close to each other and may also occupy adjacent channel spectrum, the energy spilled over from transmissions on channel B to channel A may be significantly higher than the thermal noise level in channel A. In such a scenario, the interference may significantly affect the PHY layer and medium access process (MAC) of radio A. For example, the radio A might detect channel A (i.e., the medium) as busy when radio B is on even though channel A was actually available and hence not decrease its back-off counter.

The interference may also make signals transmitted on channel A by other devices to radio A undetectable. Simultaneous transmit and receive on physically adjacent channels is avoided in many systems because of this co-interference problem. In view of the above discussion, it should be appreciated that there is a need for new and/or improved methods for reducing and/or eliminating the effect of self-interference from transmissions from a transmitter of a device which also includes a receiver subject to interference from the device's transmitter.

SUMMARY

Various embodiments are directed to reducing and/or eliminating self-interference in a wireless communications device which supports simultaneous transmission and reception. Various described methods and apparatus are well suited for supporting peer to peer signaling applications in which OFDM symbols are communicated. In some embodiments, a wireless communications device, e.g., a user equipment device (UE), includes two radios, e.g., two DSRC radios capable of receiving and/or transmitting, which may be, and sometimes are, tuned to two channels, e.g., channel A and channel B. The two channels may be close enough in frequency to one another such that transmission on one channel causes interference on the other channel. The two channels are in some, but not all embodiments, two adjacent channels, e.g., two adjacent 10 MHz DSRC channels. In some, but not necessarily all embodiments, the wireless communications device estimates the channel gain, e.g., H(A,B), between a receiver and transmitter included in the wireless communications device, e.g., a receiver in a first radio tuned to a first channel, and a transmitter in a second radio tuned to a second channel.

Consider, for example, a case where the wireless communications device is receiving a signal of interest from a second wireless communications device on the first channel, and would like to transmit a signal to a third wireless communications device on the second channel. The wireless communications device determines receive symbol timing corresponding to the received signal of interest from the second device. The wireless communications device then controls symbol timing for a transmitted symbol into the second channel such that the cyclic prefix of a received symbol of the signal of interest from the second device in the first channel at least partially overlaps with a cyclic prefix of a transmitted symbol into the second channel. The controlled synchronization, in addition to knowledge of the transmitted symbol and the channel gain estimate, facilities identification and removal of interference in reception of the first channel and recovery of the signal of interest from the second device.

In various embodiments, the wireless communications device processes a received signal in the first channel including a portion of the signal of interest from the second device and an interference component due to energy spillover from its transmission into the second channel. The processing includes interference estimation and interference removal.

An exemplary method of reducing the effect of self interference in a first device includes receiving a first portion of a wireless signal of interest from a second device on a first wireless channel, performing a transmission timing synchronization operation to synchronize transmitter symbol timing with the symbol timing of the received wireless signal of interest based on said first portion of the received wireless signal of interest, transmitting a signal including a symbol in accordance with said transmitter symbol timing, and performing an interference cancellation operation on a received signal including a second portion of the wireless signal of interest to cancel interference caused by said transmitted symbol. An exemplary first device, e.g., a first wireless communications device supporting concurrent communication on adjacent channels, includes at least one processor configured to: receive a first portion of a wireless signal of interest from a second device on a first wireless channel, perform a transmission timing synchronization operation to synchronize transmitter symbol timing with the symbol timing of the received wireless signal of interest based on said first portion of the received wireless signal of interest, transmit a signal including a symbol in accordance with said transmitter symbol timing, and perform an interference cancellation operation on a received signal including a second portion of the wireless signal of interest to cancel interference caused by said transmitted symbol. The exemplary first device further includes memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 8 is a drawing illustrating exemplary signaling in accordance with an exemplary embodiment.

DETAILED DESCRIPTION

Figure 1:
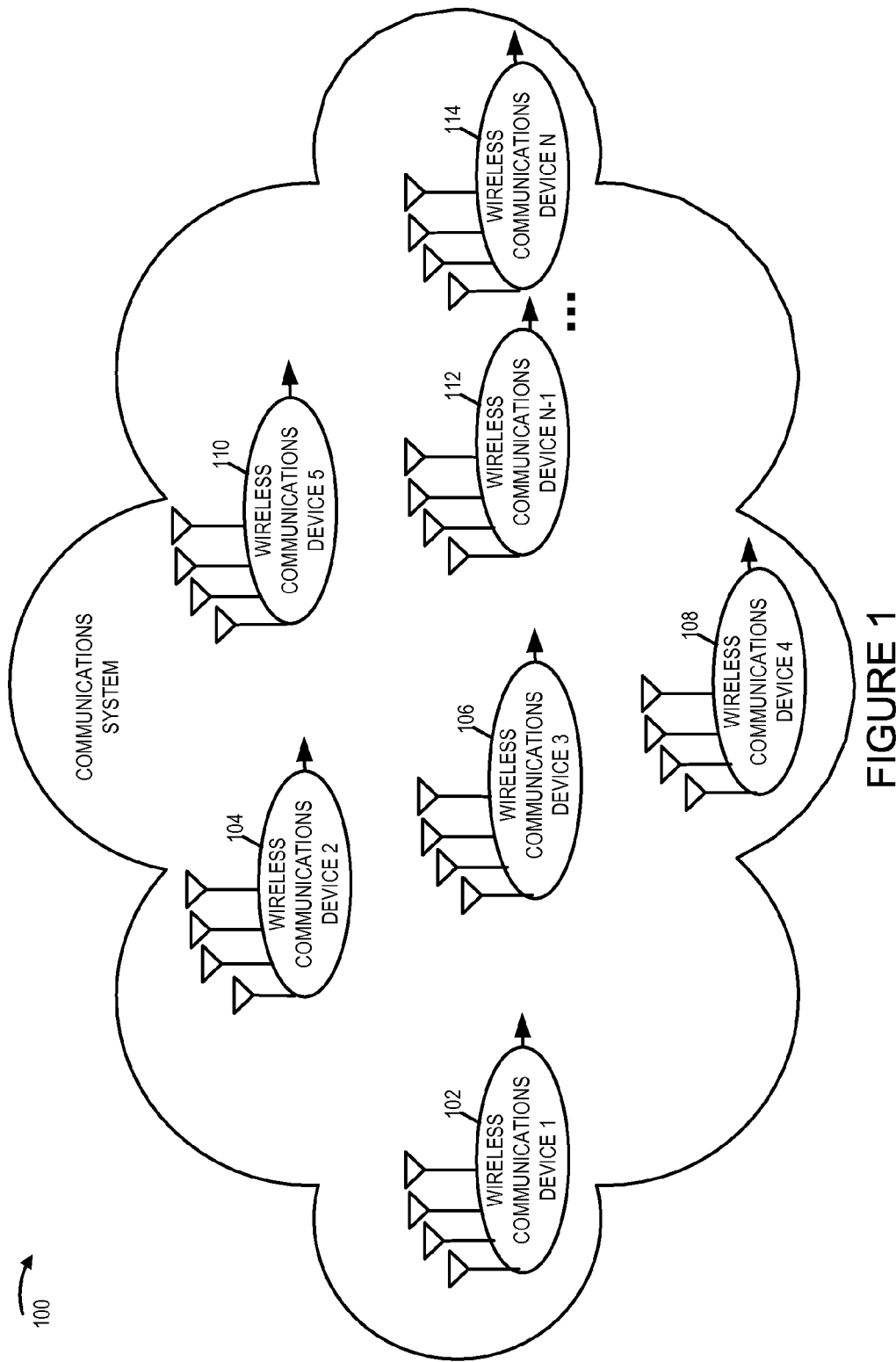
FIG. 1 is a drawing of an exemplary communications system in accordance with an exemplary embodiment.

FIG. 1 is a drawing of an exemplary communications system 100 in accordance with various exemplary embodiments. Exemplary communications system 100 includes a plurality of wireless communications devices (wireless communications device 1 102, wireless communications device 2 104, wireless communications device 3 106, wireless communications device 4 108, wireless communications device 5 110, wireless communications device (N−1) 112, . . . , wireless communications device N 114). At least some of the wireless communications devices (102, 104, 106, 108, 110, 112, . . . , 114) are mobile devices, e.g., portable handheld mobile wireless communications devices and/or wireless communications devices embedded in vehicles. A wireless communications device may, and sometimes does, operate simultaneously in two bands, e.g., operating a first radio supporting device to device communications using a first band and operating a second radio supporting device to device communications using a second band. The two bands may be, and sometimes are, adjacent non-overlapping communications bands. In one exemplary embodiment, one band is a safety band used for sending and receiving safety related messages, and the other band is used for non-safety related applications.

In various embodiments, self-interference within the wireless communications device is reduced by performing a transmission timing synchronization operation with respect to a received signal of interest, an interference estimation operation, and an interference cancellation operation. In various embodiments, the transmission timing of the interfering signal is in synchronization with respect to the received signal of interest such that the cyclic prefixes of the received signal of interest and the transmitted interfering signal at least partially overlap. In some embodiments, the overlap is controlled such that the transmission of a packet starts within the cyclic prefix (CP) of a received symbol of the signal of interest.

Figure 2:
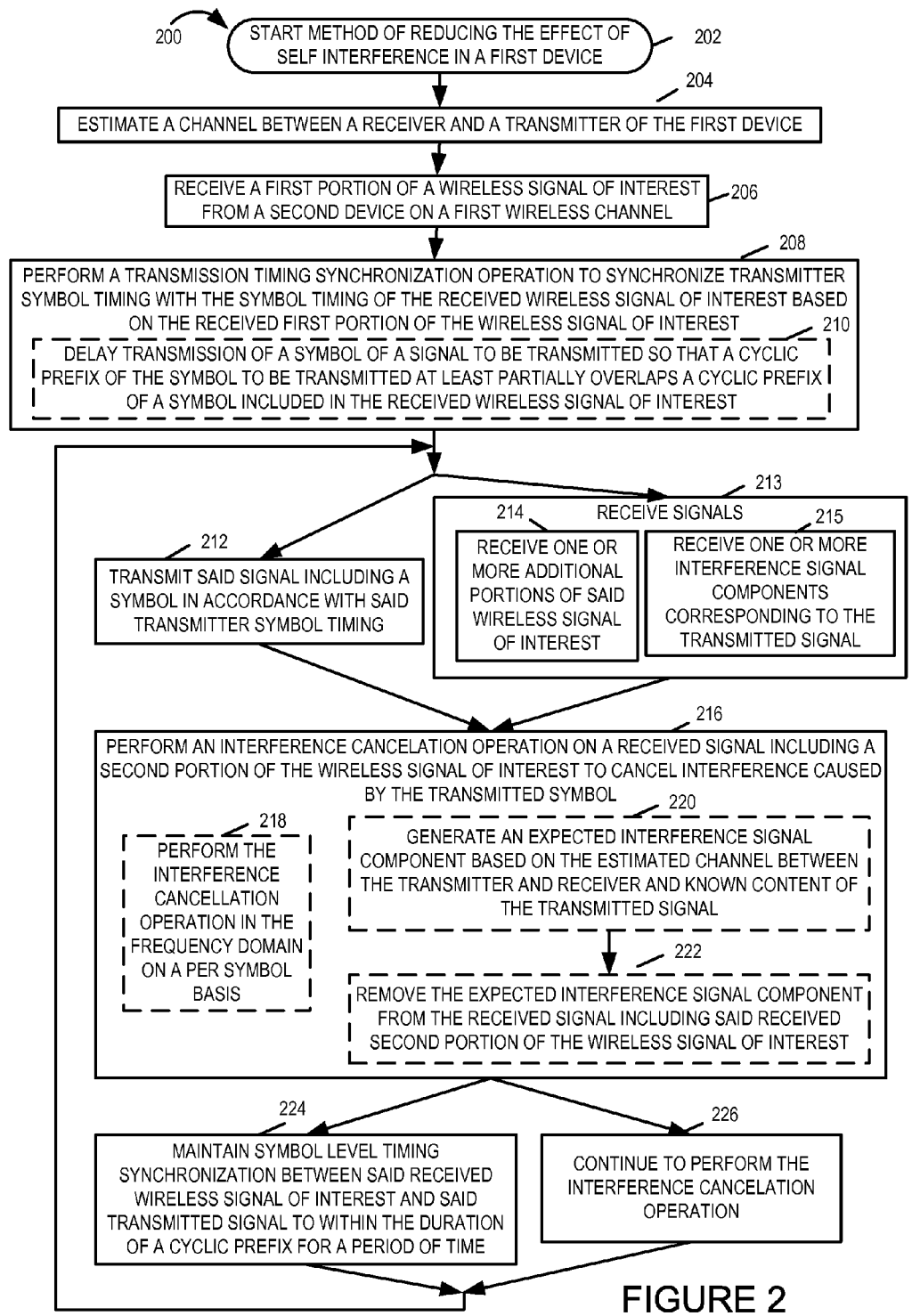
FIG. 2 is a flowchart of an exemplary method of reducing self interference in a first wireless communications device in accordance with various exemplary embodiments.

FIG. 2 is a flowchart 200 of an exemplary method of operating a first device to reduce the effect of self interference in the first device in accordance with various exemplary embodiments. The first device is, e.g., one of the wireless communications devices (102, 104, 106, 108, 110, 112, . . . , 114) of system 100 of FIG. 1. Operation of the exemplary method starts in step 202, where the first device is powered on and initialized. Operation proceeds from step 202 to step 204, in which the first device estimates a channel between a receiver and a transmitter of the first device. In some embodiments, the channel estimation of step 204 is performed as part of a calibration operation in which receiver of the first device measures reception of a known transmission signal transmitted from the transmitter of the first device during a period of time in which the receiver of the first device perceives that it is not receiving significant level signals from other devices, e.g., signals from other devices above a predetermined level, on tones of interest which are being calibrated. In some other embodiments, the channel estimation of step 204 is performed by averaging using received signals over a long time duration, e.g., many symbols, where the first device transmissions are known and other devices may also be concurrently transmitting.

In some embodiments, the transmitter is part of a first radio in the first device and the receiver is part of a second radio of the first device. In various embodiments, as part of estimating the channel between the receiver and the transmitter of the first device, a signal is transmitted by the transmitter into a first band and reception is concurrently performed by the receiver in a second band, which is adjacent the first band. In some such embodiments, the signal transmission and reception operation used to estimate the channel is performed when the wireless communications device perceives that no other device is transmitting on the same tones in the first band and that no other device is transmitting into the second band on tones in which interference is to be measured. Operation proceeds from step 204 to step 206.

In step 206, the first device, e.g., 102, receives a first portion of a wireless signal of interest from a second device, e.g., device 104, on a first wireless channel. In various embodiments, the receiving of step 206 is performed by a receiver of the first device, e.g., the receiver of the channel estimation of step 204. Operation proceeds from step 206 to step 208.

In step 208, the first device performs a transmission timing synchronization operation to synchronize transmitter symbol timing with the symbol timing of the received wireless signal of interest based on the received first portion of the received wireless signal of interest. In some embodiments, step 208 includes step 210, in which the first device delays transmission of a symbol of a signal to be transmitted so that a cyclic prefix of a symbol of the signal to be transmitted at least partially overlaps a cyclic prefix of a symbol included in the received wireless signal of interest. Timing synchronization is to within the cyclic prefix. In some embodiments, the overlap is controlled such that the cyclic prefix of a symbol of the signal to be transmitted starts within the cyclic prefix (CP) of a received symbol of the signal of interest. Operation proceeds from step 208 to steps 212, and 213.

In step 212, the first device, e.g., device 102, transmits said signal including a symbol in accordance with said transmitter symbol timing. In various embodiments, the transmitting of step 212 is performed by a transmitter of the first device, e.g., the transmitter of step 204. In some embodiments, the transmitted signal is transmitted to a third device, e.g., device 106, and the third device is different from the second device, e.g., device 104. In step 213, the first device receives signals. Step 213 includes steps 214 and 215. In step 214, the first device receives one or more additional portions of the wireless signal of interest from the second device. The one or more additional portions of the wireless signal of interest include a second portion of the wireless signal of interest. In step 215 the first device receives one or more interference signal components corresponding to the transmitted signal of step 212. In some embodiments, the first and third devices are peer to peer devices. In some embodiments, the first and second devices are peer to peer devices. Operation proceeds from steps 212 and 214 to step 216.

In step 216, the first device performs an interference cancellation operation on a received signal including said second portion of the wireless signal of interest to cancel interference caused by the transmitted symbol. The received signal on which the interference cancellation operation is performed includes the second portion of the wireless signal of interest and an interference signal component. In various embodiments, step 216 includes one or more or all of steps 218, 220 and 222. In step 218, the first device performs the interference cancellation operation in the frequency domain on a per symbol basis. In step 220, the first device generates an expected interference signal component based on the estimated channel between the transmitter and receiver and known content of the transmitted signal. In some embodiments, the known content includes information regarding tone-symbols in a least one transmitted OFDM symbol. Operation proceeds from step 220 to step 222, in which the first device removes, e.g., subtracts, the expected interference signal component from the received signal including said received second portion of the signal of interest.

Operation proceeds from step 216 to step 224 and step 226. In step 224, the first device maintains symbol level timing synchronization between said received wireless signal of interest and said transmitted signal to within the duration of a cyclic prefix for a period of time. In some such embodiments, the timing synchronization is maintained such that the start of a cyclic prefix of a transmitted symbol occurs during the reception of a cyclic prefix of a symbol of the received wireless signal of interest. In some embodiments, synchronization is maintained for multiple symbol durations, e.g., until at least the end of a packet transmission. In step 226, the wireless communications device continues to perform the interference cancellation operation, e.g., while the timing synchronization is being maintained and the device is continuing the concurrent transmission and reception.

Figure 3:
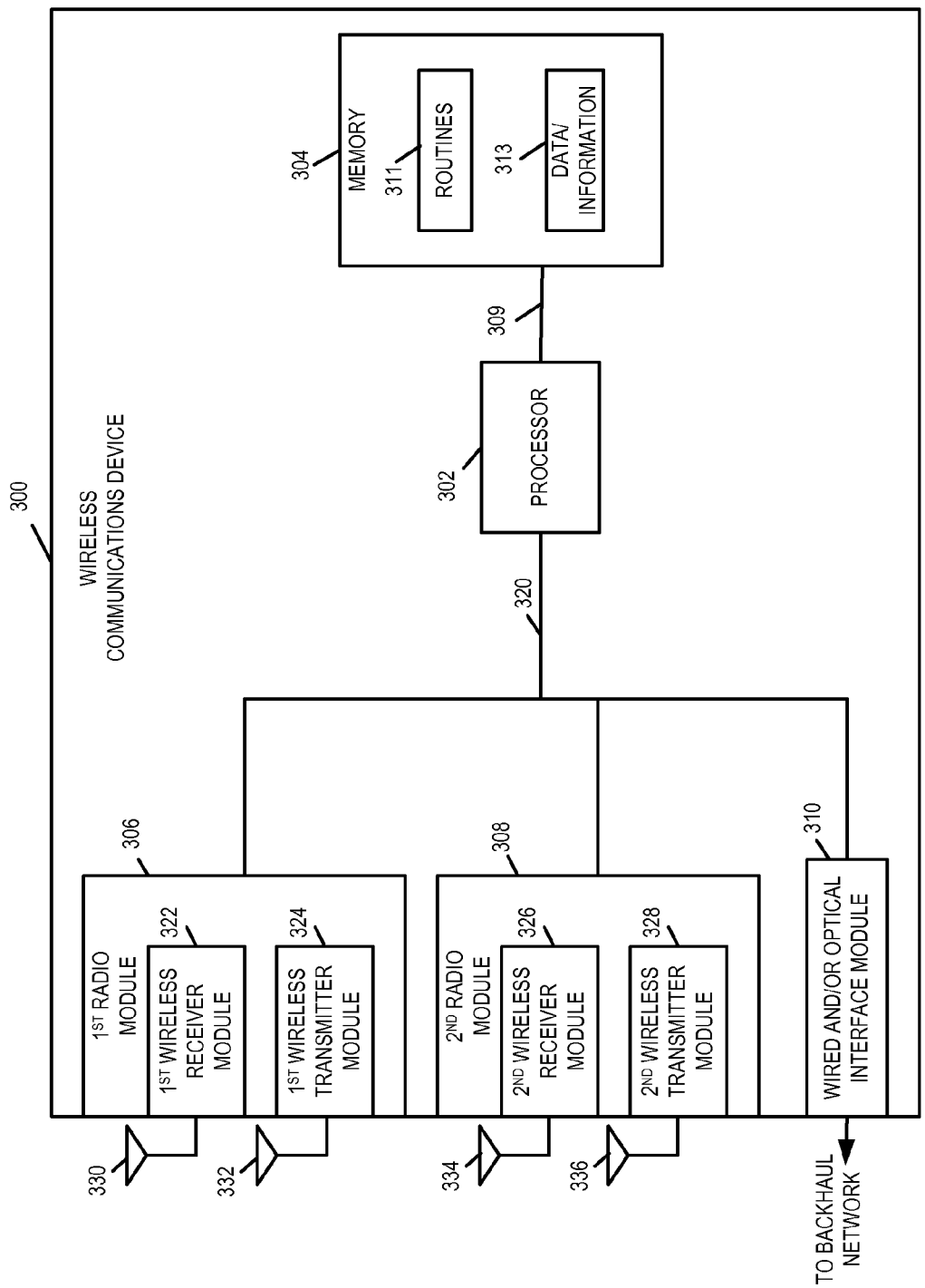
FIG. 3 is a drawing of an exemplary wireless communications device, e.g., a mobile wireless communications device which supports concurrent DSRC communications on two adjacent DSRC channels, in accordance with an exemplary embodiment.

FIG. 3 is a drawing of an exemplary wireless communications device 300 in accordance with an exemplary embodiment. The wireless communications device 300 is, e.g., one of the wireless communications devices (102, 104, 106, 108, 110, 112, . . . , 114) of system 100 of FIG. 1. In various embodiments, wireless communications device 300 supports concurrent communications in two adjacent bands, e.g., transmission into a first band and reception on a second band, which is adjacent the first band. In some embodiments, the two adjacent bands correspond to adjacent channels, e.g., two adjacent 10 MHz channels. In some such embodiments, the two adjacent channels are DSRC channels. In some such embodiments, one of the adjacent channels is dedicated to carry safety messages.

Wireless communications device 300 may, and sometimes does, implement a method in accordance with flowchart 200 of FIG. 2. Wireless communications device 300 includes a processor 302 and memory 304 coupled together via a bus 309 over which the various elements (302, 304) may interchange data and information. Wireless communications device 300 further includes a first radio module 306, a second radio module 308 and a wired and/or optical interface module 310 which may be coupled to processor 302 via bus 320 as shown. However, in some embodiments, one or more of: the first radio module 306, the second radio module 308, and the wired and/or optical interface module 310 or portions of one of more of modules (306, 308, 310) are located internal to the processor 302. First radio module 306 includes a first wireless receiver module 322, e.g., a first wireless DSRC receiver, and a first wireless transmitter module 324, e.g., a first wireless DSRC transmitter. Second radio module 308 includes a second wireless receiver module 326, e.g., a second wireless DSRC receiver, and a second wireless transmitter module 328, e.g., a second wireless DSRC transmitter.

Wireless communications device 300 further includes a first wireless communications receive antenna 330 coupled to the first wireless receiver module 322 via which the wireless communications device may receive wireless signals, e.g., DSRC signals on a first DSRC channel. Wireless communications device 300 further includes a first wireless communications transmit antenna 332 coupled to the first wireless transmit module 324 via which the wireless communications device may transmit wireless signals, e.g., DSRC signals on a first DSRC channel. Wireless communications device 300 further includes a second wireless communications receive antenna 334 coupled to the second wireless receiver module 326 via which the wireless communications device may receive wireless signals, e.g., DSRC signals on a second DSRC channel. Wireless communications device 300 further includes a second wireless communications transmit antenna 336 coupled to the second wireless transmit module 328 via which the wireless communications device may transmit wireless signals, e.g., DSRC signals on a second DSRC channel. In some embodiments, the same antenna is used for one or more or all of first wireless receiver module 322, first wireless transmitter module 324, second wireless receiver module 326, and second wireless transmitter module 328.

Wired and/or optical interface module 310 further includes a wired or optical input interface for receiving input and a wired or optical output interface for transmitting output. Memory 304 includes routines 311 and data/information 313. In some embodiments, wireless communications device 300 is a first device. In some embodiments, processor 302 is configured to receive a first portion of a wireless signal of interest from a second device on a first wireless channel via first radio module 306; and perform a transmission timing synchronization operation to synchronize transmitter symbol timing with the symbol timing of said received wireless signal of interest based on the received first portion of the received wireless signal of interest; transmit a signal including a symbol in accordance with said transmitter symbol timing via second radio module 308; and perform an interference cancellation operation on a received signal including a second portion of the wireless signal of interest received via first radio module 306 to cancel interference caused by said transmitted symbol transmitted via second radio module 308. In some embodiments, processor 302 is configured to: control a receiver (e.g., first wireless receiver module 322) in the first device to receive a first portion of a wireless signal of interest from a second device on a first wireless channel; perform a transmission timing synchronization operation to synchronize transmitter symbol timing with the symbol timing of the received wireless signal of interest based on said received first portion of the received wireless signal of interest; control a transmitter (e.g., second wireless transmitter module 328) in the first device to transmit (via second wireless transmitter module 328) a signal including a symbol in accordance with said transmitter symbol timing; and perform an interference cancellation operation on a received signal including said second portion of the wireless signal of interest to cancel interference caused by said transmitted symbol.

In various embodiments, processor 302 is configured to perform said interference cancellation operation in the frequency domain on a per symbol basis, as part of being configured to performing an interference cancellation operation.

In some embodiments, processor 302 transmits (via second radio module 308) the transmitted signal to a third device, said third device being different from said second device. In some embodiments, the first and third devices are peer to peer devices. In some embodiments, peer to peer devices communicate using direct device to device communications in which signals are not communicated via infrastructure elements such as a base station. In some embodiments, the first, second and third devices are devices using peer to peer communications, e.g., DSRC communications.

In some embodiments, said receiving is performed by a receiver (e.g., first wireless receiver module 322) included in the first device; said transmitting is performed by a transmitter (e.g., second wireless transmitter module 328) included in the first device; and processor 302 is further configured to estimate a channel between said transmitter and said receiver. In various embodiments, processor 302 is further configured to store channel estimation information for a channel between a transmitter and receiver in the first device.

In some embodiments, processor 302 is further configured to generate an expected interference signal component based on the estimated wireless channel between the transmitter (e.g., second wireless transmitter module 328) and receiver (e.g., first wireless receiver module 322) and known content of the transmitted signal; and remove, e.g., subtract, the expected interference signal component from the received receive signal including a second portion of the signal of interest, as part of being configured to perform an interference cancellation operation on a received signal including said second portion of said wireless signal of interest. In various embodiments, the received signal of interest includes multiple tones (e.g., OFDM tones) and processor 302 is further configured to perform said removing on a per tone basis. In some embodiments, said known content includes information regarding tone symbols in at least one transmitted OFDM symbol.

In various embodiments, processor 302 is configured to delay transmission of a symbol of the transmitted signal so that a cyclic prefix of a symbol to be transmitted by second wireless transmitter module 328 at least partially overlaps a cyclic prefix of a symbol included in the received wireless signal of interest received via first wireless receiver module 322, as part of being configured to perform a transmission timing synchronization operation. In some such embodiments, processor 302 is further configured to maintain symbol level timing synchronization between said received wireless signal of interest and said transmitted signal to within the duration of a cyclic prefix for a period of time. For example, timing sync is maintained for multiple symbol durations, e.g., at least until the end of a packet transmission. In some embodiments, the timing synchronization is established and maintained such that the start of a cyclic prefix of a symbol of a transmitted signal occurs during the reception of a cyclic prefix of a symbol of the received wireless signal of interest.

Figure 4:
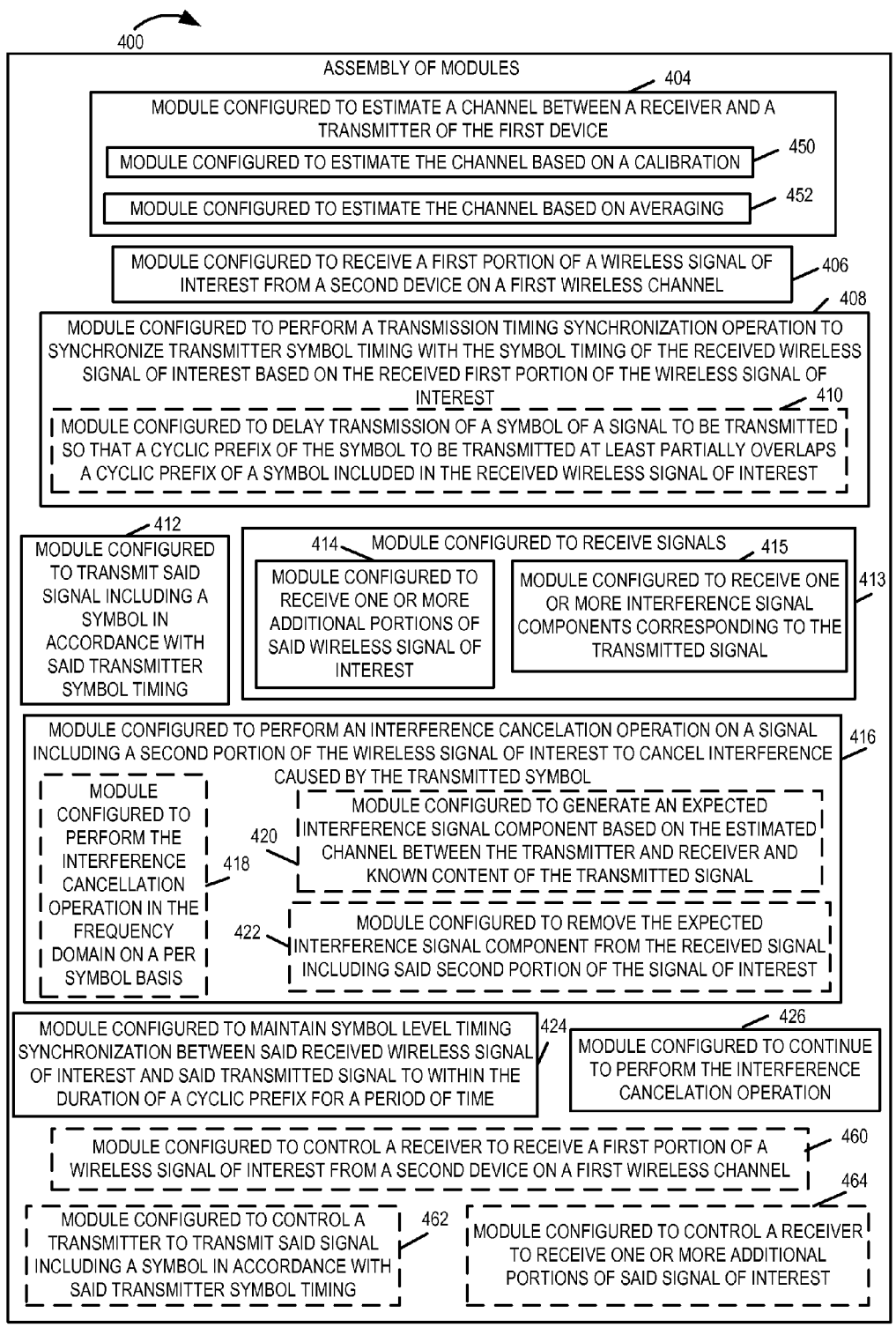
FIG. 4 is an assembly of modules which can be used in the exemplary wireless communications device illustrated in FIG. 3.

FIG. 4 is an assembly of modules 400 which can, and in some embodiments is, used in the wireless communications device 300 illustrated in FIG. 3. The modules in the assembly 400 can, and in some embodiments are, implemented fully in hardware within the processor 302, e.g., as individual circuits. In other embodiments some of the modules are implemented, e.g., as circuits, within the processor 302 with other modules being implemented, e.g., as circuits, external to and coupled to the processor. In some embodiments, some of all of the modules in assembly of modules 400 are implemented in a radio module, e.g., first radio module 306 and/or second radio module 308. As should be appreciated, the level of integration of modules on the processor and or with some modules being external to the processor may be one of design choice. Alternatively, rather than being implemented as circuits, all or some of the modules may be implemented in software and stored in the memory 304 of wireless communications device 300 shown in FIG. 3 with the modules controlling operation of the communications device 300 to implement the functions corresponding to the modules when the modules are executed by a processor, e.g., processor 302. In still other embodiments, various modules are implemented as a combination of hardware and software, e.g., with a circuit external to the processor 302 providing input to the processor 302 which then under software control operates to perform a portion of a module's function.

While shown in the FIG. 3 embodiment as a single processor 302, e.g., computer, within device 300, it should be appreciated that processor 302 may be implemented as one or more processors, e.g., computers. When implemented in software, the modules include code, which when executed by the processor, configure the processor, e.g., computer, to implement the function corresponding to the module. In some embodiments, processor 302 is configured to implement each of the modules of the assembly of modules 400. In embodiments where the assembly of modules 400 is stored in memory 304, and the memory 304 is a computer program product, the computer program product comprising a computer readable medium, e.g., a non-transitory computer readable medium, comprising code, e.g., individual code for each module, for causing at least one computer, e.g., processor, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the device 300 or elements therein such as the processor 302 to perform the functions of the corresponding steps illustrated and/or described in the method of flowchart 200 of FIG. 2.

FIG. 4 is an assembly of modules 400 in accordance with various embodiments. Assembly of modules 400 includes a module 404 configured to estimate a channel between a receiver and a transmitter of the first device, a module 406 configured to receive a first portion of a wireless signal of interest from a second device on a first wireless channel, a module 408 configured to perform a transmission timing synchronization operation to synchronize transmitter symbol timing with the symbol timing of the received wireless signal of interest based on the first portion of the received wireless signal of interest, a module 412 configured to transmit said signal including a symbol in accordance with said transmitter symbol timing, and a module 413 configured to receive signals, e.g., signals which may include additional components of the received signal of interest and interference components corresponding to transmitted signals. Module 413 includes a module 414 configured to receive one or more additional portions of said wireless signal of interest from said second device and a module 415 configured to receive one or more interference signal components corresponding to the transmitted signal. The received signal received by module 413 includes, e.g., a second portion of the received signal of interest and an interference signal component corresponding to the transmission performed by module 412. Module 408 includes a module 410 configured to delay transmission of a symbol of a signal to be transmitted so that a cyclic prefix of a symbol to be transmitted at least partially overlaps a cyclic prefix portion of a symbol included in the received wireless signal of interest. In some embodiments, module 410 delays the start of a cyclic prefix of a symbol of a transmitted signal to occur during the reception of a cyclic prefix of a symbol of the received signal of interest.

Assembly of modules 400 further includes a module 416 configured to perform an interference cancellation operation on a received signal including said second portion of the wireless signal of interest to cancel interference caused by the transmitted symbol, and a module 424 configured to maintain symbol level timing synchronization between said received wireless signal of interest and said transmitted signal to within the duration of a cyclic prefix for a period of time. For example, timing synchronization is maintained for multiple symbol durations, e.g., at least until the end of a packet transmission. Assembly of modules 400 further includes a module 426 configured to continue to perform the interference cancellation operation, e.g., while the symbol level timing synchronization is being maintained and the concurrent transmission and reception are being performed.

In some embodiments, module 404 includes one or both of a module 450 configured to estimate the channel between a receiver and transmitter of the first device based on a calibration and a module 452 configured to estimate the channel between a receiver and transmitter of the first device based on averaging. In some embodiments including module 450, module 450 estimates the channel based on received measurements collected when the received signal from the transmitter of the first device is perceived to be the predominant received signal component, e.g., other devices in the vicinity of the first device are not transmitting on the tones being calibrated and the transmission from the first device is a known signal. In some embodiments including module 452, averaging is used to estimate the channel between a receiver and transmitter of the first device using received signals which include multiple symbols and which may include both transmissions from the transmitter of the first device and concurrent transmissions from another device, e.g., received interference signals from the transmitter of the first device and received signals from another device.

In various embodiments, module 416 includes one or more or all of a module 418 configured to perform the interference cancellation operation in the frequency domain on a per symbol basis, a module 420 configured to generate an expected interference signal component based on the estimated channel between the transmitter and receiver and known content of the transmitted symbol, and a module 422 configured to remove the expected interference signal component form the received second portion of the signal of interest.

In some embodiments, assembly of modules 400 includes a module 460 configured to control a receiver to receive a first portion of a wireless signal of interest from a second device on a first wireless channel, a module 462 configured to control a transmitter to transmit said signal including a symbol in accordance with said transmitter symbol timing, and a module 464 configured to control a receiver to receive a signal including a second portion of said wireless signal of interest from said second device.

Figure 5:
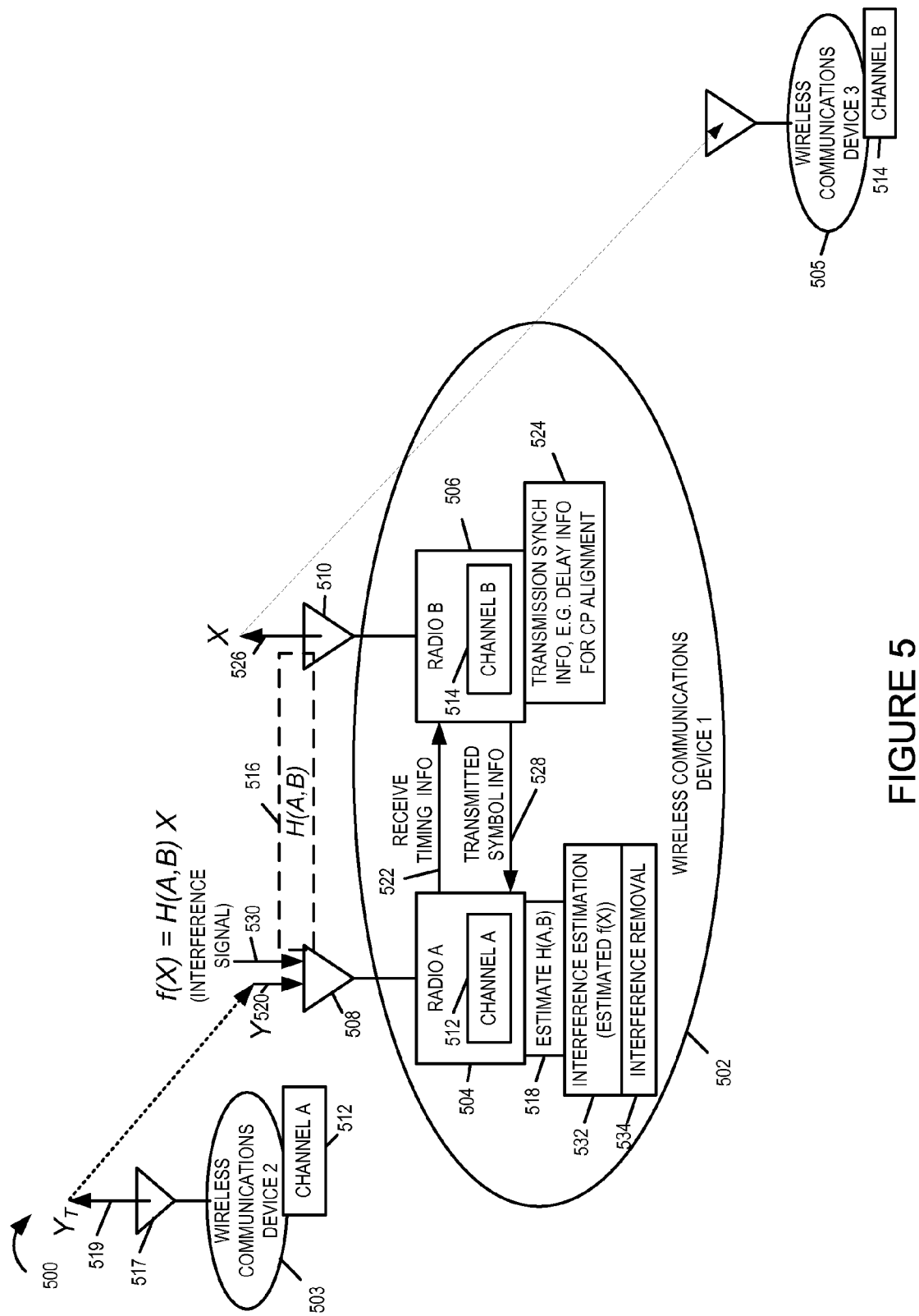
FIG. 5 is a drawing illustrating a plurality of wireless communications devices including a wireless communications device which performs a method of self-interference reduction in accordance with an exemplary embodiment.

FIG. 5 is a drawing 500 illustrating a plurality of wireless communications devices (wireless communications device 1 502, wireless communications device 2 503, wireless communications device 3 505) communicating in accordance with an exemplary embodiment. The wireless communications devices (502, 503, 505) are, e.g., any of the wireless communications devices (102, 104, 106, 108, 110, 112, ..., 114) of system 100 of FIG. 1. Wireless communications device 1 502 implements a method in accordance with flowchart 200 of FIG. 2 and/or is implemented in accordance with device 300 of FIG. 3 and/or includes assembly of modules 400 of FIG. 4.

Wireless communications device 1 502 includes radio A 504, e.g., a first DSRC radio, which is tuned to channel A 512 and radio B 506, e.g., a second DSRC radio, which is tuned to channel B 514. Consider that channel A 512 and channel B 514 correspond adjacent 10 MHz channels.

There is a wireless channel H(A,B) between the transmitter of radio B 506 and the receiver of radio A 504 represented by dotted line box 516. Wireless communications device 1 502 estimates a channel between the transmitter of radio B 506 and the receiver of radio A 504, and stores the estimate as estimate H(A,B) 518.

Wireless communications device 2 503, which includes a transmitter tuned to operate on channel A 512, starts to transmit signal $Y_T$ 519 via antenna 517 Wireless communications device 1 502 receives a first potion of signal Y 520 via antenna 508. Signal Y 520 is the received signal corresponding to transmitted signal $Y_T$ 519. Wireless communications device 1 502 performs a transmission timing synchronization operation to synchronize transmitter symbol timing for radio B 506 with the symbol timing of the received wireless signal Y 520 based on the first portion of the received wireless signal Y 520. As part of the timing synchronization, receive timing information 522 is communicated from radio A 504 to radio B 506 and/or to a device controlling operation of the receiver of radio A and the transmitter of radio B. Wireless communications device 1 502 determines transmission synchronization information 524, e.g., delay information to achieve cyclic prefix alignment to within the duration of a cyclic prefix with regard to CPs of the receive signal Y 520 and the CPs of the transmission signal X 526, based on the received timing information 522. In some embodiments, the start of a CP of a symbol of transmitted signal X 526 is controlled to be within the duration of a CP of a symbol of received signal Y 520.

Wireless communications device 1 502 controls the transmitter of radio B 506 to delay transmission of a symbol of signal X to be transmitted so that the start of the transmission of the symbol of signal X falls within a period of time in which wireless communications device 1 502 receives a cyclic prefix portion of a symbol included in signal Y 520, in accordance with transmission synchronization information 524. The transmitter of radio B 506 transmits signal X 526 via antenna 510.

Wireless communications device 1 502 continues to receive via antenna 508 on channel A, while wireless communications device 1 502 transmits signal X 526 including one or more symbols in accordance with the determined transmitter symbol timing based on the determined transmission synchronization information 524. The received signal now includes a second portion of signal Y 520 from wireless communications device 2 503 and interference signal f(X) 530, where f(X)=H(A,B) X Transmitted signal X 526 is intended for wireless communications device 3 505, which includes a receiver tuned to channel B 514; however, generated interference from the transmission leaks into channel A, which is adjacent to channel B. In some embodiments, radio B 506 or another module within device 1 502, e.g., a module generating signal X 526 and/or controlling the transmitter of radio B 506, communicates transmitted symbol information 528 to the receiver of radio A 504 to be available to be used for interference removal.

In this example, the distance between wireless communications device 1 502 and wireless communications device 3 505 is larger than the distance between wireless communications device 2 503 and wireless communications device 1 502. Further, consider that wireless communications device 1 502 transmits signal X 526 at a higher transmission power level than the power level at which wireless communications device 2 503 transmits signal 519, e.g., based on the different channel conditions, e.g., longer distance more expected losses in signal gain. Consider that a significant amount of interference signal from transmission signal X 526 is received via antenna 508, e.g., due to channel B and channel A being adjacent channels.

Wireless communications device 1 502 performs an interference cancellation operation on the received signal, including the second portion of received signal Y 520 and the received interference signal 530, to cancel signal interference caused by the transmitted symbol or symbols of signal X 526. In various embodiments, the interference cancellation operation is performed in the frequency domain on a per symbol basis. Wireless communications device 1 502 generates an expected interference signal, interference estimation 532, which is an estimated f(X), based on the estimated channel 518 between the transmitter of radio B 506 and the receiver of radio A 504, and known content of the transmitted signal X 526, which was communicated in transmitted symbol information 528.

Wireless communications device 1 502 removes the expected interference component from the received signal as indicated by block 534. Wireless communications device 1 502 maintains symbol level timing synchronization between the received signal Y 520 and transmitted signal X 526 to the duration of a cyclic prefix for a period of time and continues with the interference cancellation operation. In some embodiments, the period of time includes multiple symbol durations. In some embodiments, the period of time is until at least the end of a packet transmission.

FIG. 5 has been described in the scenario with radio A 504 receiving and radio B 506 transmitting. It should be appreciated, that a similar method may be, and sometimes is, applied in the reverse scenario in which radio B 506 is receiving a signal of interest and radio A 504 would like to transmit concurrently.

Figure 6:
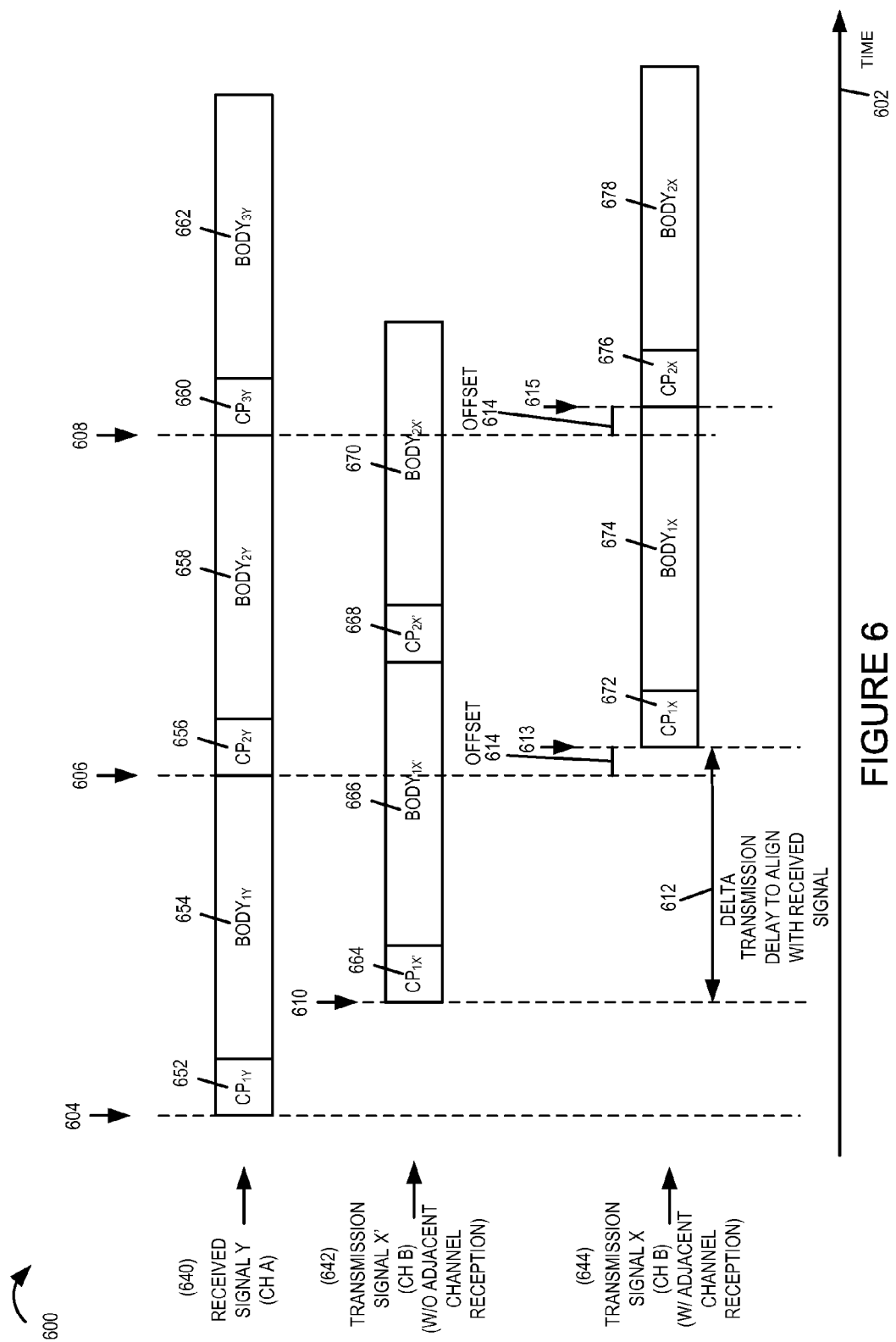
FIG. 6 is a drawing illustrating exemplary signaling and exemplary controlled synchronization in accordance with an exemplary embodiment.

FIG. 6 is a drawing 600 illustrating exemplary signaling and exemplary controlled synchronization in accordance with an exemplary embodiment. Horizontal axis 602 represents time. Received signal Y 640 is a signal received by a first communications device on channel A. Received signal Y 640 is an OFDM signal including a plurality of OFDM symbols. In this example, three received OFDM symbols of signal Y are shown. Each OFDM symbol includes a cyclic prefix (CP)_portion and a body portion, and has a fixed predetermined duration. Signal Y symbol 1 includes $CP_{1Y}$ 652 and $BODY_{1Y}$ 654. Signal Y symbol 2 includes $CP_{2Y}$ 656 and $BODY_{2Y}$ 658. Signal Y symbol 3 includes $CP_{3Y}$ 660 and $BODY_{3Y}$ 662. Timing reference lines 604, 606 and 608 correspond to the start of receive symbol timing for (first, second, and third) symbol, respectively of signal Y at the first communications device.

Transmission signal X' 642 is an exemplary signal transmitted on channel B where channel B is not an adjacent channel to channel A and the first communications device is not concerned with self-interference from its transmission in channel B with regard to its reception of signal Y 640 on channel A. Transmission signal X' 642 is an OFDM signal including a plurality of OFDM symbols. In this example two transmission OFDM symbols of signal X' 642 are shown. Signal X' 642 symbol 1 includes $CP_{1X'}$ 664 and $BODY_{1X'}$ 666. Signal X' 642 symbol 2 includes $CP_{2X'}$ 668 and $BODY_{2X'}$ 670. Timing reference line 610 corresponds to the start of transmission of the first symbol of signal X' 642.

Transmission signal X 644 is an exemplary signal transmitted on channel B where channel B is an adjacent channel to channel A, and the first communications device is concerned with self-interference from its transmission in channel B with regard to its reception of signal Y 640 on channel A. Transmission signal X 644 is an OFDM signal including a plurality of OFDM symbols.

The first wireless communications device would like to start its transmission of signal X 644 at time 610; however, the first communications device delays its transmission by time Delta 612, where Delta 612 is a determined delay to align transmission of signal X 644 with the received signal Y 640. In various embodiments, the delay is up to the duration of 1 symbol. In some such embodiments, 1 symbol duration is approximately 8 micro-sec.

In this example, two transmission OFDM symbols of signal X 644 are shown. Signal X 644 symbol 1 includes $CP_{1X}$ 672 and $BODY_{1X}$ 674. Signal X 644 symbol 2 includes $CP_{2X}$ 676 and $BODY_{2X}$ 678. Timing reference line 613 corresponds to the start of transmission of the first symbol of signal X 644, and timing reference line 615 corresponds to the start of transmission of the second symbol of signal X 644. There is a fixed offset 614 between the start of transmission of each symbol of signal X 644 and the start of a symbol in received signal Y 640, which is maintained such that the CPs of the received signal 640 overlaps with the cyclic prefixes of the transmitted signal 644, which facilitates self-interference removal. In various embodiments, the timing is maintained such that the start of a cyclic prefix of a symbol of transmitted signal X occurs during the reception of a cyclic prefix of a symbol of received signal Y.

In one exemplary embodiment, received signal Y 640 of FIG. 6 is signal Y 520 of FIG. 5, transmission signal X 644 is signal X 526 of FIG. 5, the first wireless communications device described in FIG. 6 is wireless communications device 502 of FIG. 5, and the synchronization described in FIG. 6 is used to facilitate removal of interference signal f(X) of FIG. 5.

In some embodiments, signal Y 640 includes more symbols than illustrated in FIG. 6. In some embodiments, signal Y 640 communicates a packet. In various embodiments, signal X 644 includes more symbols than illustrated in FIG. 6. In some embodiments, signal X 644 communicates a packet.

Figure 7:
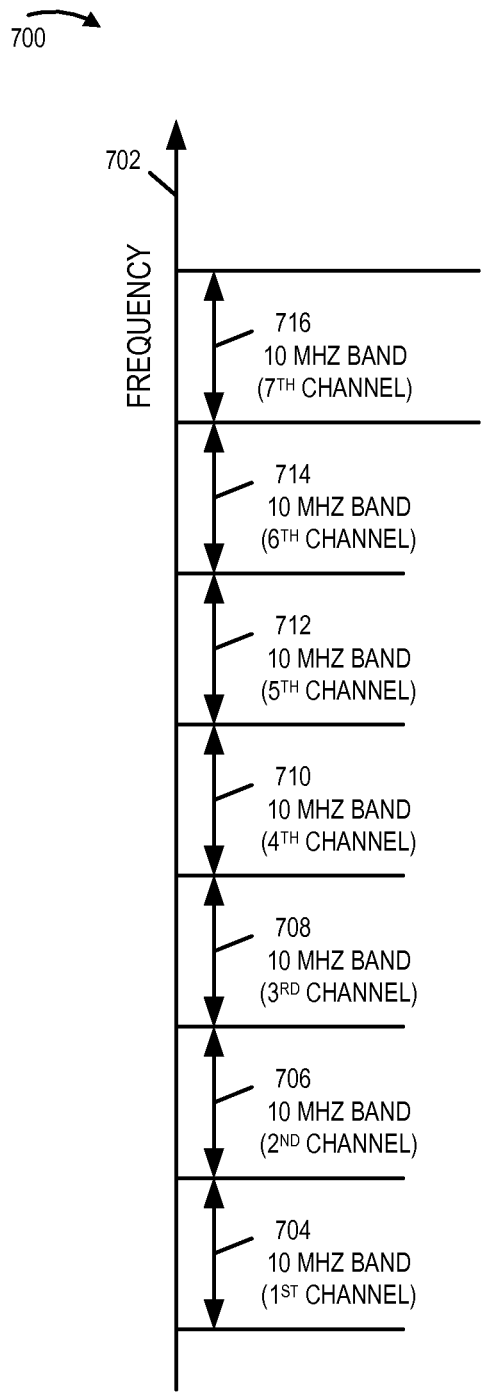
FIG. 7 is a drawing illustrating an exemplary set of alternative communications bands and corresponding channels, e.g., DSRC channels, in accordance with an exemplary embodiment.

FIG. 7 is a drawing 700 illustrating an exemplary set of alternative communications bands and corresponding channels in accordance with an exemplary embodiment. Vertical axis 702 represents frequency. Seven exemplary communications bands (704, 706, 708, 710, 712, 714, 716) are illustrated which correspond to channels ($1^{st}$ channel, $2^{nd}$ channel, $3^{rd}$ channel, $4^{th}$ channel, $5^{th}$ channel, $6^{th}$ channel, $7^{th}$ channel), respectively. In some embodiments, the different channels are DSRC channels. In one exemplary embodiment, a wireless communications device implements a method in accordance with flowchart 200 of FIG. 2 when the wireless communications is using two adjacent channels, e.g., the wireless communications device has DSRC radio A to band 710 corresponding to the 4$^{th}$ channel and has tuned DSRC radio B to band 712 corresponding to the 5$^{th}$ channel, and the wireless communications device intends to receive on one of the adjacent channels while transmitting concurrently on the other one of the adjacent channels. The exemplary method FIG. 2 reduces the effects of self-interference in the wireless communications device. In some embodiments, one of the two adjacent channels is a DSRC safety channel and the other one of the two adjacent channels is a DSRC channel which is not a safety channel.

FIG. 8 is a drawing 800 illustrating exemplary signaling in accordance with an exemplary embodiment. Horizontal axis 802 represents time. Received signal Y 810 is a signal received by a first communications device on channel A. Received signal Y 810 is an OFDM signal including a plurality of OFDM symbols. In this example three received OFDM symbols of signal Y are shown. Each OFDM symbol includes a cyclic prefix portion and a body portion, and has a fixed predetermined duration. Signal Y symbol 1 includes $CP_{1Y}$ 822 and $BODY_{1Y}$ 824. Signal Y symbol 2 includes $CP_{2Y}$ 826 and $BODY_{2Y}$ 828. Signal Y symbol 3 includes $CP_{3Y}$ 830 and $BODY_{3Y}$ 832. Timing reference lines 804, 806 and 808 correspond to the start of receive symbol timing for (first, second, and third) symbol, respectively of signal Y at the first communications device.

Transmission signal X 812 is an exemplary signal transmitted on channel B where channel B is an adjacent channel to channel A, and the first communications device is concerned with self-interference from its transmission in channel B with regard to its reception of signal Y 810 on channel A. Transmission signal X 812 is an OFDM signal including a plurality of OFDM symbols.

The first wireless communications device would like to start its transmission of signal X 812 at a time prior to 806; however, the first communications device delays its start of transmission such that its $CP_{1X}$ 834 partially overlaps with $CP_{2Y}$ 826. In particular, first communications device delays its start of transmission such that the start of transmission of $CP_{1X}$ 834 occurs during the duration of $CP_{2Y}$ 826, e.g., at the time indicated by dotted line 871. Controlled timing synchronization is maintained between symbols of the transmitted signal X 812 and symbols of the received signal of interest Y 810. The start of transmission of $CP_{2X}$ 838 occurs during the duration of $CP_{3Y}$ 830, e.g., at the time indicated by dotted line 873. This controlled alignment of the received signal of interest and the interfering signal, such that the CPs overlap, facilitates interference estimation and removal.

In this example two transmission OFDM symbols of signal X 812 are shown. Signal X 812 symbol 1 includes $CP_{1X}$ 834 and $BODY_{1X}$ 836. Signal X 812 symbol 2 includes $CP_{2X}$ 838 and $BODY_{2X}$ 840. The transmission of signal X 812 into channel A results in a received interference signal f(X) 814 on channel B, where f(X)=H(A,B) X.

The combined signal 816 received by the first communications device's receiver which is tuned to channel A includes received signal of interest 810 and interference signal 814. Combined received signal 816 includes, during different times, received signal 844 including a component from received signal of interest Y and received signal 846 including a component from the received signal of interest Y and a component from the received interference signal f(X).

The first communications device generates an expected interference signal 818 based on known transmission signal X 812 and the first communications device's estimate of channel H(A,B). The first communications device removes the generated interference signal 818 from the combined received signal 816 and obtains a recovered signal of interest Y 820. Recovered signal of interest Y symbol 1 includes $CP_{R1Y}$ 850 and $BODY_{R1Y}$ 852. Recovered signal of interest Y symbol 2 includes $CP_{R2Y}$ 854 and $BODY_{R2Y}$ 856. Recovered signal of interest Y symbol 3 includes $CP_{R3Y}$ 858 and $BODY_{R3Y}$ 860.

In one example, received signal of interest Y 810 of FIG. 8 is received signal of interest Y 640 of FIG. 6, and transmission signal X 812 of FIG. 8 is transmission signal X 642 of FIG. 6.

In one example, elements (870, 872, 874, 876, and 878) of FIG. 8 are (the first portion of a wireless signal of interest referred to step 206, the second portion of the wireless signal of interest referred to in step 216, received signal including a second portion of the signal of the interest received in step 213 and processed in step 216, generated expected interference signal component referred to in step 220, and result of step 222), respectively, of flowchart 200 of FIG. 2.

Various aspects and/or features of some, but not necessarily all embodiments, are discussed below. Various embodiments are directed to methods and apparatus for effectively canceling out the interference seen at one radio from another radio within a device. One aspect of various embodiments is for radio A to use the knowledge of symbols transmitted by radio B, since both radio A and radio B are within the same device. An exemplary radio A in channel A hears the received interference signal f(X), corresponding to the transmissions, e.g., Wi-Fi packet transmissions, from an exemplary radio B. The radio A is aware of the transmitted symbols by the radio B since radio A is within the same device as radio A. For example, radio B provides the transmitted symbols to radio A. Radio A estimates the interference signal=estimate (f(X). Radio A cancels out the interference signal from its received signal.

In some embodiments, the radio A constantly keeps canceling out the interference signal from B even when there are no other transmissions by nearby nodes. Thus, the radio A can access the medium and transmit even when its own self interference is significantly high.

In one embodiment, radio A receives the interference signal from radio B, and identifies that there are no other significant interferers other than radio B. Radio A uses the received signal to calibrate the channel H_(A,B) between radio A and radio B. Thus, the radio A estimates the channel H_(A,B), and then cancels out the interfering signal at any time (in the presence of other transmitters) by estimating the interfering signal as H~_(A,B)*X, where X is the known symbol transmitted by radio B and H~ is the channel estimate.

In another embodiment, the radio A estimates H(A,B) by averaging over a long enough duration. Estimate (H_(A,B))= average over many symbols [(1/X)*(X*H_(A,B)+Y+N)]. Here, the average of (Y+N)/X tends to zero as Y and N are zero mean.

The interference cancellation process may, and in some embodiments does, include measuring the channel between the transmitter and receiver of the device and then canceling the interference at the receiver from a transmitted signal based by applying the inverse of the signal that is expected to be received based on the known transmitted signal and the estimated channel between the transmitter and receiver.

In one exemplary embodiment symbol level synchronization is employed to facilitate and/or simplify the interference cancellation process and improve the level of interference cancellation in the received signal as compared to systems where the transmitted signal is not synchronized at a symbol level with a signal, e.g., a signal of interest, being received from another device.

In one exemplary embodiment, a wireless device having two radios synchronizes its transmit symbols in a first radio (up to within a CP length) boundary in the presence of another transmission simultaneously being received by the second radio.

In one exemplary embodiment, Radio A receiving in channel A hears received signal Y and identifies the symbol boundary. Signal Y is, e.g., a Wi-Fi packet. In some embodiments, radio A is operating in accordance with an 802.11p MAC protocol. In some embodiments, a synchronization signal is then sent to radio B. Radio B, operating on channel B, may also operate in accordance with an independent 802.11p MAC protocol and may obtain permission to transmit a packet by participating in the CSMA/CA back off mechanism. The access time may not be symbol level synchronous with the transmissions in channel A. To achieve synchronization, the radio operating on channel B, if the CSMA mechanism allows it to transmit at time t, may, and sometimes does, delay the beginning of the transmission to t+delta (by up to one symbol duration) in order to synchronize its position with the symbol boundaries of the original transmission Y received by radio A.

In an exemplary embodiment, with synchronized transmit signals, self interference f(X) is estimated and the self interference is cancelled. Simple frequency domain cancellation techniques may be used in OFDM systems even in the presence of inter-symbol interference due to the presence of a cyclic prefix (802.11p systems also use an OFDM symbol.)

It can be appreciated that when the interfering signal is not symbol-wise aligned to the received signal, the cancellation techniques can become quite complicated. This is especially true in asynchronous systems such as 802.11p where the MAC is a CSMA based MAC. Thus, simultaneous transmissions are not required to be aligned at symbol boundaries.

Various embodiments are directed to methods and apparatus for effectively canceling out the interference seen at one radio from another radio within a device. In one aspect, radio A uses knowledge of the symbols transmitted by radio B. Since radio A and B may be collocated, e.g., in a vehicle, and, in some embodiments, packaged as a single wireless device, the symbols transmitted by radio B may be, and in some embodiments, are provided to radio A.

In one exemplary embodiment, radio A in channel A hears the received interference signal f(X). The received signal f(x) may, for example, correspond to Wi-Fi packet transmissions from radio B. In some embodiments, Radio A is also aware of the transmitted symbols by radio B since radio A and radio B may be located within the same device and/or radio B may provide the transmitted symbols to radio A. Radio A, in some embodiments, then estimate the interference signal (i.e. estimate f(X)) and cancel the interference signal from a received signal.

In one embodiment radio A continuously cancels the interference signal from B even when there are no other transmissions by nearby nodes. In this environment, radio A can, and sometimes does, access the medium and transmit even when its own self interference (f(X)) is high.

In another embodiment, radio A receives the interference signal from radio B, and identifies that there are no other significant interferers other than radio B. Radio A then uses the received signal to calibrate the channel H_(A,B) between radio A and radio B. Radio A thus estimate the channel H_(A,B), and cancel out the interfering signal at any time. Those skilled in the art may appreciate that after H_(A,B) is characterized, Radio A may be able to cancel the interference signal even in the presence of other transmitters. This may be done by estimating the interfering signal as H~_(A,B)*X, where X is the known symbol transmitted by radio B and H~ is the channel estimate.

In yet another embodiment, radio A estimates H(A,B) by averaging over a long enough duration. For example radio A estimates (H_(A,B)) by averaging over many symbols [(1/X) *(X*H_(A,B)+Y+N)]. Here, the average of (Y+N)/X tends to zero as Y and N are zero mean.

In various embodiments, a device of any of the Figures includes a module corresponding to each of the individual steps and/or operations described with regard to any of the Figures in the present application and/or described in the detailed description of the present application. In some embodiments, the modules are implemented in hardware, e.g., in the form of circuits. Thus, in at least some embodiments the modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., stationary nodes and/or mobile nodes such as mobile terminals supporting wireless communications, e.g., DSRC communications, access points such as base stations, and/or communications systems. Various embodiments are also directed to methods, e.g., method of controlling and/or operating stationary nodes, mobile nodes, access points such as base stations, network nodes and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as wireless terminals, network nodes, and/or access nodes, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., a communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol. Various embodiments are well suited for DSRC.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In some embodiments, a wireless communications device, e.g., a mobile node, which implements a method is embedded in a vehicle. In various embodiments the mobile nodes are implemented as notebook computers, personal data assistants (PDAs), or other portable devices including receiver/transmitter circuits and logic and/or routines, for implementing the methods.

What is claimed is:

1. A method of reducing the effect of self interference in a first device, the method comprising:
    receiving a first portion of a wireless signal of interest from a second device in a first frequency band;
    performing a transmission timing synchronization operation to synchronize transmitter symbol timing, used for communications in a second frequency band which is different from said first frequency band, with the symbol timing of the received wireless signal of interest based on the received first portion of the wireless signal of interest;
    transmitting a signal including a symbol into said second frequency band in accordance with said transmitter symbol timing; and
    performing an interference cancellation operation on a received signal, received in said first frequency band, including a second portion of the wireless signal of interest to cancel interference caused by transmitting said symbol into said second frequency band.

2. The method of claim 1,
    wherein said first and second frequency bands are adjacent non-overlapping frequency bands; and
    wherein performing an interference cancellation operation includes performing said interference cancellation operation in the frequency domain on a per symbol basis.

3. The method of claim 1,
    wherein said receiving is performed by a receiver;
    wherein said transmitting is performed by a transmitter;
    the method further comprising:
    estimating a channel between said transmitter and said receiver, said step of estimating the channel between said transmitter and said receiver including:
        transmitting from said transmitter, a known signal into a frequency band into which said transmitter transmits signals;
        receiving via said receiver the known signal in a frequency band in which said receiver receives signals, said frequency band in which said receiver receives signals being different from and adjunct said frequency band into which said transmitter transmits signals; and
        estimating the channel based on the known signal transmitted from said transmitter and received by said receiver.

4. The method of claim 1,
    wherein said first and second frequency bands are Dedicated Short Range Communications (DSRC) bands for direct device to device communications; and
    wherein said first and second frequency bands are adjacent frequency bands.

5. The method of claim 4,
wherein performing an interference cancellation operation on a received signal including a second portion of said wireless signal of interest includes:
- generating an expected interference signal component based on the estimated channel between the transmitter and receiver and known content of the transmitted signal; and
- removing the expected interference signal component from the received signal including a second portion of the signal of interest; and
- wherein said known content includes information regarding tone symbols in at least one transmitted OFDM symbol.

6. The method of claim 4, wherein said first DRSC band is used for communicating safety information and said second DRSC band is used for communicating non-safety information.

7. The method of claim 1, wherein performing a transmission timing synchronization operation includes:
- delaying transmission of a symbol of the transmitted signal so that a cyclic prefix of a symbol to be transmitted at least partially overlaps a cyclic prefix of a symbol included in the received wireless signal of interest.

8. The method of claim 7, further comprising:
- maintaining symbol level timing synchronization between said received wireless signal of interest and said transmitted signal to within the duration of a cyclic prefix for a period of time.

9. A first device comprising:
- means for receiving a first portion of a wireless signal of interest from a second device in a first frequency band; and
- means for performing a transmission timing synchronization operation to synchronize transmitter symbol timing, used for communications in a second frequency band which is different from said first frequency band, with the symbol timing of the received wireless signal of interest based on the received first portion of the received wireless signal of interest;
- means for transmitting a signal including a symbol into said second frequency band in accordance with said transmitter symbol timing; and
- means for performing an interference cancellation operation on a received signal, received in said first frequency band, including a second portion of the wireless signal of interest to cancel interference caused by transmitting said symbol into said second frequency band.

10. The first device of claim 9,
wherein said first and second frequency bands are adjacent non-overlapping frequency bands; and
wherein said means for performing an interference cancellation operation includes means for performing said interference cancellation operation in the frequency domain on a per symbol basis.

11. The first device of claim 9,
wherein said means for receiving is a receiver; and
wherein said means for transmitting is a transmitter; the first device further comprising:
- means for estimating a channel between said transmitter and said receiver, said means for estimating the channel between said transmitter and said receiver estimating said channel based on a known signal transmitted from said transmitter into a frequency band into which said transmitter transmits signals and received by said receiver in a frequency band in which said receiver receives signals, said frequency band in which said receiver receives signals being different from and adjunct said frequency band into which said transmitter transmits signals.

12. The first device of claim 9, wherein said first and second frequency bands are Dedicated Short Range Communications (DSRC) bands for direct device to device communications; and
wherein said first and second frequency bands are adjacent frequency bands.

13. The first device of claim 12,
wherein said means for performing an interference cancellation operation on said received signal including a second portion of said signal of interest includes:
- means for generating an expected interference signal component based on the estimated channel between the transmitter and receiver and known content of the transmitted signal; and
- means for removing the expected interference signal component from the received signal including a second portion of the signal of interest; and
- wherein said known content includes information regarding tone symbols in at least one transmitted OFDM symbol.

14. The first device of claim 9, wherein said means for performing a transmission timing synchronization operation includes:
- means for delaying transmission of a symbol of the transmitted signal so a cyclic prefix of a symbol to be transmitted at least partially overlaps a cyclic prefix of a symbol included in the received wireless signal of interest.

15. The first device of claim 14, further comprising:
- means for maintaining symbol level timing synchronization between said received wireless signal of interest and said transmitted signal to within the duration of a cyclic prefix for a period of time.

16. A computer program product for use in a first device, the computer program product comprising:
a non-transitory computer readable medium comprising:
- code for causing at least one computer to receive a first portion of a wireless signal of interest from a second device in a first frequency band;
- code for causing said at least one computer to perform a transmission timing synchronization operation to synchronize transmitter symbol timing, used for communications in a second frequency band which is different from said first frequency band, with the symbol timing of the received wireless signal of interest based on the received first portion of the received wireless signal of interest;
- code for causing said at least one computer to transmit a signal including a symbol into said second frequency band in accordance with said transmitter symbol timing; and
- code for causing said at least one computer to perform an interference cancellation operation on a received signal, received in said first frequency band, including a second portion of the wireless signal of interest to cancel interference caused by transmitting said symbol into said second frequency band.

17. A first device comprising:
at least one processor configured to:
- receive a first portion of a wireless signal of interest from a second device in a first frequency band; and
- perform a transmission timing synchronization operation to synchronize transmitter symbol timing, used for communications in a second frequency band which is different from said first frequency band, with the symbol timing of said received wireless signal of interest based on the received first portion of the received wireless signal of interest;

transmit a signal including a symbol into said second frequency band in accordance with said transmitter symbol timing; and perform an interference cancellation operation on a received signal, received in said first frequency band, including a second portion of the wireless signal of interest to cancel interference caused by transmitting said symbol into said second frequency band; and memory coupled to said at least one processor.

18. The first device of claim 17, wherein said first and second frequency bands are adjacent non-overlapping frequency bands; and wherein said at least one processor is configured to perform said interference cancellation operation in the frequency domain on a per symbol basis, as part of being configured to performing an interference cancellation operation.

19. The first device of claim 17, wherein said at least one processor is configured to control a receiver to perform receiving operations;

wherein said at least one processor is configured to control a transmitter to perform transmitting operations; and wherein said at least one processor is further configured to estimate a channel between said transmitter and said receiver based on a known signal transmitted from said transmitter into a frequency band into which said transmitter transmits signals and received by said receiver in a frequency band in which said receiver receives signals, said frequency band in which said receiver receives signals being different from and adjunct said frequency band into which said transmitter transmits signals.

20. The first device of claim 17 wherein said at least one processor is further configured to generate an expected interference signal component based on the estimated channel between the transmitter and receiver and known content of the transmitted signal; and removing the expected interference signal component from the received signal including a second portion of the signal of interest, as part of being configured to perform an interference cancellation operation on said received signal including a second portion of the signal of interest.

21. The first device of claim 20, wherein said known content includes information regarding tone symbols in at least one transmitted OFDM symbol.

* * * * *

UNITED STATES PATENT AND TRADEMARK OFFICE
CERTIFICATE OF CORRECTION

| | | |
|---|---|---|
| PATENT NO. | : 8,780,964 B2 | Page 1 of 1 |
| APPLICATION NO. | : 13/656459 | |
| DATED | : July 15, 2014 | |
| INVENTOR(S) | : Sundar Subramanian, Xinzhou Wu and Junyi Li | |

It is certified that error appears in the above-identified patent and that said Letters Patent is hereby corrected as shown below:

In the Claims

In column 18 at line 56, In Claim 3, change "adjunct" to --adjacent--.
In column 20 at line 2, In Claim 11, change "adjunct" to --adjacent--.
In column 22 at line 8, In Claim 19, change "adjunct" to --adjacent--.

Signed and Sealed this
Twenty-eighth Day of October, 2014

Michelle K. Lee
*Deputy Director of the United States Patent and Trademark Office*